United States Patent
Deng et al.

(10) Patent No.: US 8,306,712 B2
(45) Date of Patent: *Nov. 6, 2012

(54) ROAD SURFACE CONDITION IDENTIFICATION BASED ON STATISTICAL PATTERN RECOGNITION

(75) Inventors: Weiwen Deng, Rochester Hills, MI (US); Qingrong Zhao, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 897 days.

This patent is subject to a terminal disclaimer.

(21) Appl. No.: 12/409,649

(22) Filed: Mar. 24, 2009

(65) Prior Publication Data

US 2010/0250086 A1 Sep. 30, 2010

(51) Int. Cl.
G06F 7/00 (2006.01)
G06F 17/00 (2006.01)
G06F 19/00 (2011.01)

(52) U.S. Cl. .................................................. 701/65
(58) Field of Classification Search ................ 73/6, 149; 703/2, 6, 8; 701/1, 41–44, 48, 69, 70, 72, 701/74, 80, 82, 65
See application file for complete search history.

(56) References Cited

U.S. PATENT DOCUMENTS

| 5,801,647 | A | 9/1998 | Survo et al. |
| 6,040,916 | A | 3/2000 | Griesinger |
| 6,308,115 | B1 * | 10/2001 | Yamaguchi et al. ............ 701/1 |
| 6,526,804 | B2 * | 3/2003 | Takahashi .......................... 73/9 |
| 6,842,683 | B2 * | 1/2005 | Kim .................................. 701/70 |
| 7,774,103 | B2 * | 8/2010 | Deng et al. ........................ 701/1 |

OTHER PUBLICATIONS

Overview of Electric Wave Radiometer, Advanced Cruise-Assist Highway System Research Association, (http://www.ahrsa.or.jp/eng/d01e/k2rt/what6501.htm).

* cited by examiner

Primary Examiner — Khoi Tran
Assistant Examiner — Harry Oh

(57) ABSTRACT

A method is provided for determining an adhesive condition of a surface of a vehicle road using a statistical pattern recognition technique. A plurality of probability distribution functions is provided representing respective adhesive effects between the vehicle tire of a driven vehicle and the vehicle road. An index is calculated which represents a vehicle understeer characteristic. Probability analysis is applied for each of the road surface adhesive conditions as a function of the index. Each probability analysis is recursively updated. A likelihood factor is determined for each road surface adhesive condition as a function of each respective recursively updated probability analysis. Each respective road surface adhesive condition has a respective likelihood factor that identifies the likelihood of the road surface having the respective adhesive condition as a function of the index. The identified adhesive condition of the road surface is input into a vehicle control process.

14 Claims, 5 Drawing Sheets

| ROAD SURFACE CONDITIONS | | FRICTIONAL COEFFICIENT |
|---|---|---|
| CATEGORIES (CONDITIONS) | SUB-CATEGORIES (SUB-CONDITIONS) | |
| DRY | DRY | 0.70-1.00 |
| WET | WET | 0.60-0.80 |
| WATER FILM | SHALLOW WATER FILM | 0.45-0.65 |
| | THICK WATER FILM | 0.40-0.60 |
| SNOW COVER | SLUSH | < 0.40 |
| | NEW SNOW | < 0.30 |
| | COMPACTED SNOW | < 0.20 |
| FREEZING | ICE FILE | < 0.25 |
| | COMPACTED SNOW WITH ICE CRUST | < 0.15 |

Fig. 3

ROAD SURFACE CONDITION IDENTIFICATION BASED ON STATISTICAL PATTERN RECOGNITION

BACKGROUND OF INVENTION

An embodiment relates generally to identifying an adhesive effect of the road surface upon which a vehicle is traveling.

Road surface condition identification has been mainly through remote-sensing measurement based on the reflection and absorption characteristics of the road pavement utilizing various methods including microwave and optical sensing techniques. However, this approach can be rather complicated since the frictional characteristics of the detected surfaces are largely dependent on a combination of surface pattern, strength, and elasticity, and even surface temperature, in addition to extra cost on the sensors and processors. On the other hand, road surface condition can also be inferred from the estimation of road surface friction. But this approach typically requires evasive maneuvers so that tire operates under nonlinear or near-limit region. Therefore, it is often not very practical since many active safety and driver-assist features mainly operate under normal driving maneuvers that do not generate the needed large excitation for the tire to operate in nonlinear or near limit region. In addition, this approach typically requires extra sensors, such as corner force measurement.

SUMMARY OF INVENTION

An advantage of an embodiment of the invention is the use of a statistical pattern recognition technique which estimates and identifies an adhesive condition of a road surface based on one of a plurality of pre-classified road surface adhesive categories. The system estimates the adhesive condition of the road from a plurality of pre-classified road surface categories while driving under any driving maneuvers including normal driving maneuvers and while minimizing the cost and complexities arising from additional hardware and sensors employed with other systems.

An embodiment of the invention contemplates a method of determining an adhesive condition of a surface of a vehicle road using a statistical pattern recognition technique. A plurality of probability distribution functions are provided for a plurality of road surfaces which represent respective adhesive effects between the vehicle tire of a driven vehicle and the vehicle road. A steering wheel angle, a vehicle speed, and a yaw rate of the driven vehicle are obtained. An index is calculated which represents a vehicle understeer characteristic for a vehicle traveling on a current road that is a function of the steering wheel angle input, the vehicle speed, and the yaw rate. Probability analysis is applied for each of the road surface adhesive conditions as a function of the index. The probability analysis is recursively updated for each respective road surface adhesive condition. A likelihood factor is determined for each road surface adhesive condition as a function of each respective recursively updated probability analysis. Each respective road surface adhesive condition has a respective likelihood factor that identifies the likelihood of the road surface having the respective adhesive condition as a function of the index. The identified adhesive condition of the road surface along with its likelihood factor is input into a vehicle control process. The vehicle control process may be a single vehicle control process or a plurality of vehicle control processes, which may include, but is not limited to, an adaptive cruise control process, a vehicle stability control process, and a lane keeping control process.

An embodiment of the invention contemplates a method for determining an adhesive condition of a surface of a vehicle road using a statistical pattern recognition technique; (a) a plurality of probability distribution functions is provided for a plurality of road surfaces which represent respective adhesive effects between the vehicle tire of a driven vehicle and the vehicle road; (b) a count is set to an initial setting; (c) vehicle operating characteristic data is obtained; (d) an index is determined based on the vehicle operating characteristic data; (e) a probability analysis is applied for each adhesive condition road surface as a function of the determined index; (f) the probability analysis for each respective road surface adhesive condition is recursively updated as a function of the count; (g) a determination is made whether the count is less than a predetermined count; (h) steps (c)-(g) are repeated if the count is less than the predetermined count; (i) a likelihood factor is determined for each road surface adhesive condition as a function of each respective recursively updated probability analysis where each respective road surface adhesive condition has a respective likelihood factor that identifies the likelihood of the road surface having the respective adhesive condition as a function of the index; (j) the respective likelihood factor is selected that identifies the adhesive condition of the road surface traveled by the vehicle; (k) the identified adhesive condition of the road surface along with the respective likelihood factor is input into a vehicle control process.

BRIEF DESCRIPTION OF DRAWINGS

FIG. 3 is a table of examples of various road surface conditions.

DETAILED DESCRIPTION

Figure 1:
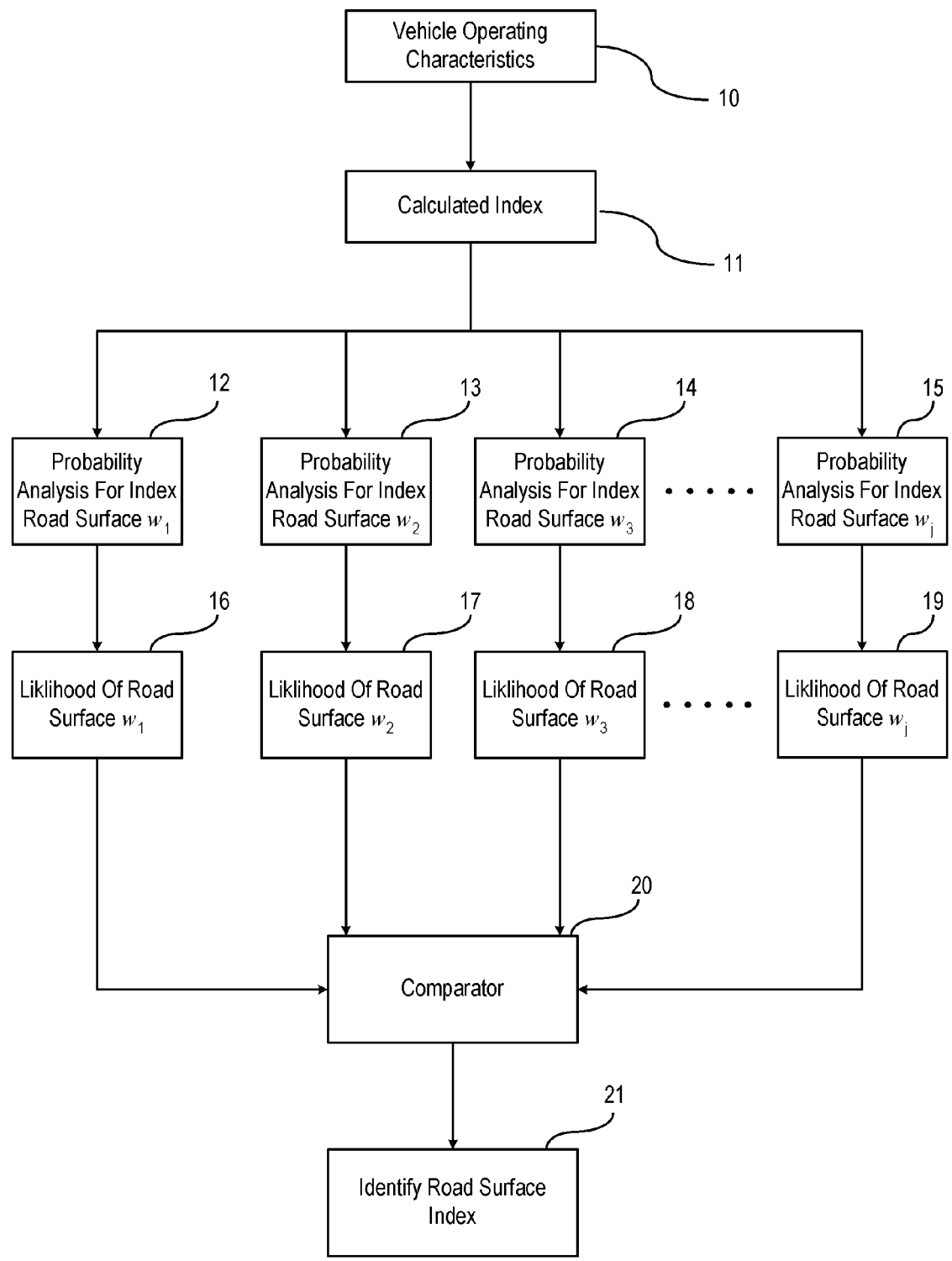
FIG. 1 is a system flow diagram of the statistical pattern recognition technique for road surface condition identification.

FIG. 1 is a broad flow diagram illustrating the road surface condition identification technique set forth in an embodiment of the invention. The road surface condition identification technique is conducted under normal driving conditions and identifies an adhesive effect of a road surface condition from one of a plurality of possible road surface adhesive conditions. It is understood that normal driving conditions include a vehicle driving along a road where no evasive maneuvers are required. The road surface condition identification technique estimates the adhesive effect of a road surface based on a determined index of each known road surface condition stored in memory and determines the likelihood of each adhesive effect being the condition of the current traveled road. It should be understood that the likelihood as described herein is only one embodiment of the invention and may be identified in more ways than described herein.

The estimation technique described herein is based on linear tire operating conditions. Under a vehicle tire nonlinear or near-limit operating region, the vehicle dynamics show significant differences between the different road conditions making the identification of the road surface model readily ascertainable. In contrast to vehicle tire non-linear or near-limit operating region, the vehicle dynamics show small differences between the different road conditions making the identification of the road surface difficult to ascertain. Therefore, non-linear or near-limit operation regions require evasive maneuver to produce large slip. Linear operating region does not require evasive maneuvers; however, identifying road surfaces in the linear region is more difficult due to the small differences in the tire forces generated among different road surfaces. The method in this embodiment can identify the road surface condition in the linear region without the requirement of evasive maneuvers and no extra sensors or hardware cost as compared to many other approaches. The embodiments that are described herein overcome the difficulties of determining a road surface condition while the vehicle is driving in a linear tire operating region. It should also be understood that the embodiments described herein may also identify the road surface condition when the vehicle is operating in the non-linear or near-limit region in addition to the linear region.

In block 10, vehicle operating characteristics are monitored during the operation of the vehicle. The vehicle operating characteristics that are monitored include the vehicle front wheel steering angle derived by the driver steering input, the vehicle longitudinal velocity, and the vehicle yaw rate. Other vehicle characteristics may include features such as a distance between the front and rear axles of the vehicle. Vehicle operating characteristics are monitored and recorded at a predetermined time interval.

In block 11, a road surface index ρ is computed based on the measured and predetermined vehicle operating characteristics. The index ρ is equivalent to a vehicle understeer gradient that is less sensitive to driver steering input and vehicle speed, but more sensitive to road surface conditions. The equation for defining the road surface index ρ is as follows:

$$\rho = \frac{\delta_f v_x - rl}{r v_x^2} \quad (1)$$

where $\delta_f$ is a vehicle front wheel steering angle, $v_x$ is a vehicle longitudinal velocity, l is a distance between the front and rear axles of the vehicle, and r is a measured vehicle yaw rate of the driven vehicle.

In blocks 12-15, a probability analysis for each road surface condition (i.e., the adhesive effect of each road surface condition) is performed as a function of the computed road surface index ρ. The probability analysis is determined based on a probability distribution function for each road surface condition for each computed road surface index ρ. Each of the respective probability analysis computations may be performed in parallel to one another so that the plurality of probability analysis may be determined over a same instance of time.

In blocks 16-19, a respective likelihood factor is determined based on each respective probability analysis. The likelihood factor represents a likelihood that the respective adhesive effect is the road surface condition of the current traveled road. The likelihood factor may be represented in various forms which will be discussed in detail later.

In block 20, a comparison is made among the likelihood factors for identifying a respective road surface condition that is the most likely of being the current road surface condition.

In block 21, the likelihood factor having the highest likelihood is identified as the road surface condition. The identified adhesive affect of the road surface condition is provided to a vehicle control processing unit for enhancing vehicle control. Vehicle control systems adjust their control operations based on road surface conditions to enhance vehicle stability and performance. A vehicle control process may be, but is not limited to, an adaptive cruise control process, a vehicle stability control process, and a lane keeping control process.

Figure 2:
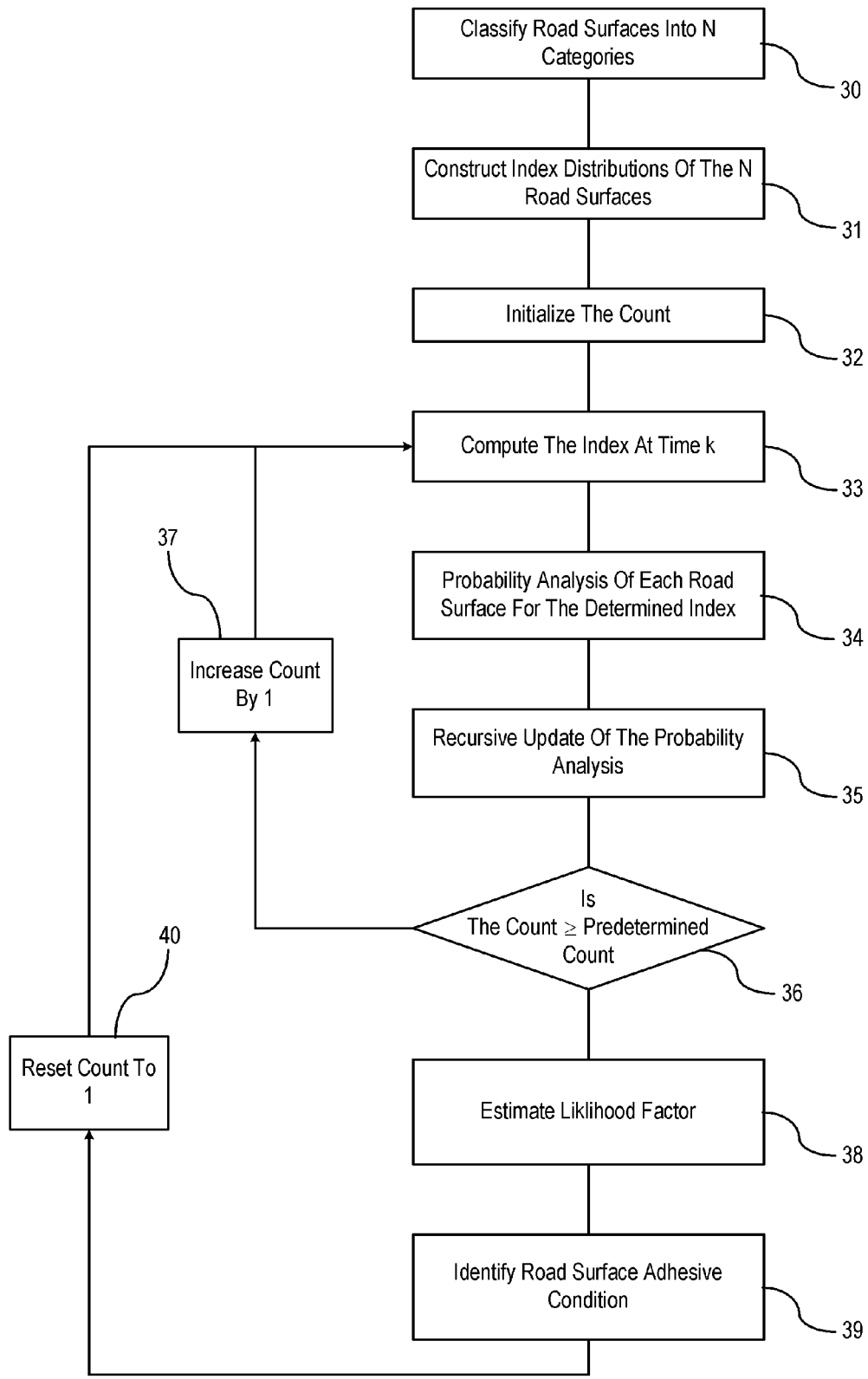
FIG. 2 is a detailed flow diagram of the each respective road surface condition identification technique as shown in FIG. 1.

FIG. 2 illustrates a flowchart for a method illustrating a detailed flow diagram for determining the adhesive effects of the road surface condition.

In block 30, a plurality of road surface conditions that are identified by an adhesive effect between a vehicle tire and road are provided in a database. The various road surfaces are classified into a number of categories (N) where each category represents the various road surface conditions relating to a respective coefficient of friction. The table shown in FIG. 3 shows examples of various categories and subcategories of road surface conditions and their respective coefficient of friction values. It should be understood that the list may include more or less categories and/or subcategories and their respective coefficient of friction values than what is shown and described herein.

Figure 4:
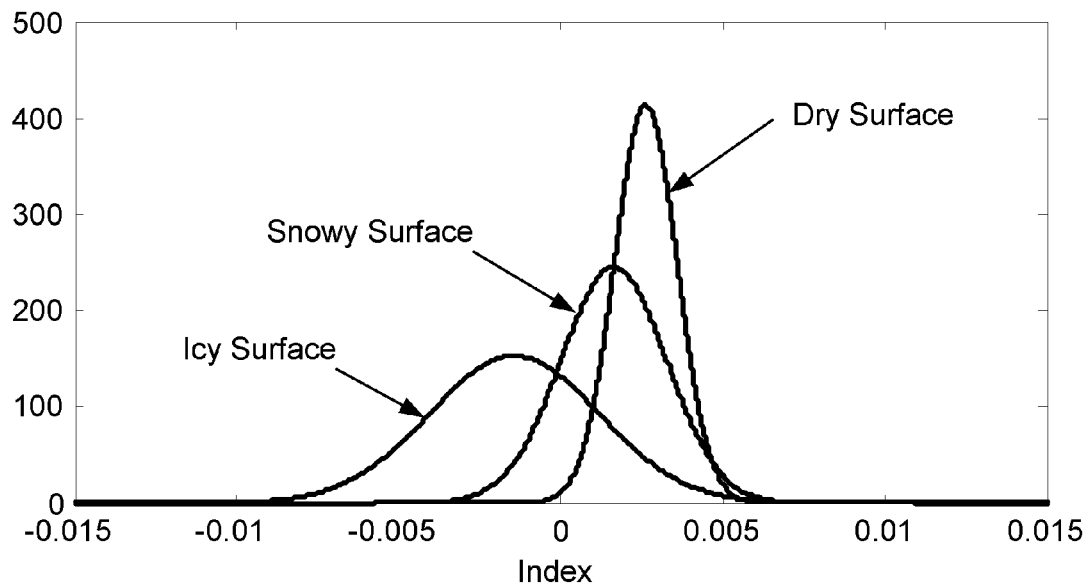
FIG. 4 is an example of probability distribution function plots for respective road surface conditions.

In block 31, the database contains a plurality of probability density functions of the index ρ The index distribution of each probability density function $p(\rho\backslash w_j)$ is determined for each road surface category $w_j$. Therefore, a probability density function is provided for each road surface category in the database. The data for determining the probability distribution functions is empirical and is collected offline during vehicle testing and is stored in a memory, a database, a classifier, or other similar memory device in the vehicle for data retrieval. Based on analysis of the collected data, it is understood that the index distribution on each road surface condition $w_j$ can be reasonably approximated to be a normal distribution as represented by the following:

$$p(\rho\backslash w_j) = \frac{1}{\sigma\sqrt{2\pi}} e^{\frac{(\rho - u_j)^2}{2\sigma_j^2}} \quad (2)$$

where $(j = 1, 2, \ldots, N)$ where the index ρ is normally distributed with mean $u_j$ and standard deviation $\sigma_j$ for each respective road surface $w_j$ FIG. 4 illustrates examples of a few of the probability density function distribution curves derived over various road surface indices. The graph illustrates a probability density function for an icy surface, a dry surface, and a snowy surface; however, it is understood that the number of probability density functions as shown in FIG. 4 is for illustrative purposes only and that more or less probability density functions may be used.

In block 32, the online road surface condition identification technique as executed by the vehicle is initialized. During the initialization period, a count m is set to 1. It is initially assumed that the probability is equal for any one of the known road surface conditions stored in a database being the road surface condition of the traveled road. This probability is represented by the following formula:

$$\hat{P}_o(w_j) = 1/N \text{ where}(j=1, 2, \ldots, N) \quad (3)$$

where N is the number of road surface categories (i.e., conditions), $w_j$ represents the j-th road surface condition for $j=1, 2, \ldots, N$). It should be understood that the initial probability $\hat{P}_0(w_j)$ described herein is only one embodiment of the invention and can be set to a different value to reflect the prior knowledge of it, if there is any acquired.

In block 33, the road surface index ρ is determined for the current road traveled by the vehicle at each time instance k. The formula for determining the index at each time instance k is as follows:

$$\rho_k = \frac{\delta_f v_x - rl}{r v_x^2} \tag{3}$$

Probability density of $\rho_k$ on each road surface adhesive condition $w_j$ can be readily obtained from the database by the following formula:

$$p(\rho_k \backslash w_j) = \frac{1}{\sigma\sqrt{2\pi}} e^{\frac{(\rho_k - u_j)^2}{2\sigma_j^2}} \tag{4}$$

where $$(j = 1, 2, \ldots, N)$$

In block 34, a respective probability analysis estimate $\hat{P}(w_j\backslash\rho_k)$ is determined for the vehicle traveling on a respective road surface condition $w_j$ utilizing a respective index that is equal to a respective index $\rho_k$ at that instance of time. The probability estimate may be determined using Bayes' Rule. The estimate of the probability analysis $\hat{P}(w_j\backslash\rho_k)$ for the vehicle traveling on road surface $w_j$, given a calculated index of $\rho=\rho_k$ is represented by the following formula:

$$\hat{P}(w_j\backslash\rho_k) = \frac{p(\rho_k \backslash w_j)\hat{P}_{k-1}(w_j)}{\sum_{n=1}^{N} p(\rho_k \backslash w_n)\hat{P}_{k-1}(w_n)}, \tag{5}$$

$$(j = 1, \ldots, N)$$

where $\rho(\rho_k\backslash w_j)$ is the probability density value of the calculated index $\rho_k$ on road surface adhesive condition $w_j$, and where $\hat{P}_{k-1}(w_j)$ is the probability estimate of the vehicle traveling on road surface adhesive condition $w_j$ at time step k−1.

In step 35, the probability estimate of the vehicle traveling on road surface adhesive condition $w_j$ is recursively updated utilizing the following formula:

$$\hat{P}(w_j) = \frac{1}{m} \sum_{i=k-m+1}^{k} \hat{P}(w_j\backslash\rho_i) \tag{6}$$

where m is a variable count value of the counter.

In block 36, a determination is made whether the counter value (m) is greater than or equal to a predetermined count number (M). If the counter value (m) is not equal to or greater than the predetermined count value, then the routine proceeds to block 37 where the counter value is incremented (e.g., incremented by 1). The routine then returns to block 33 to determine a new index value $\rho_k$ for a next time instance. If the counter value (m) is equal to or greater than (M), then the routine proceeds to block 38.

In block 38, a likelihood factor $\hat{L}(w_j)$ is determined for each respective road surface condition $w_j$ based on its respective probability analysis $\hat{P}(w_j)$. The likelihood factor represents the likelihood of the vehicle traveling on the respective road surface condition $w_j$. The likelihood factor is determined by the following formula:

$$\hat{L}(w_j) = \hat{P}(w_j) = \frac{1}{M} \sum_{i=k-M+1}^{k} \hat{P}(w_j\backslash\rho_i) \tag{7}$$

$$(j = 1, 2, \ldots, N)$$

where $\hat{P}(w_j\backslash\rho_k)$ is the probability analysis for each road surface adhesive condition $w_j$ based on the calculated index $\rho_k$, and M represents a predetermined fixed value. The likelihood factor $\hat{L}(w_j)$ is a respective probability analysis $\hat{P}(w_j)$ when m is equal to M.

Figure 5:
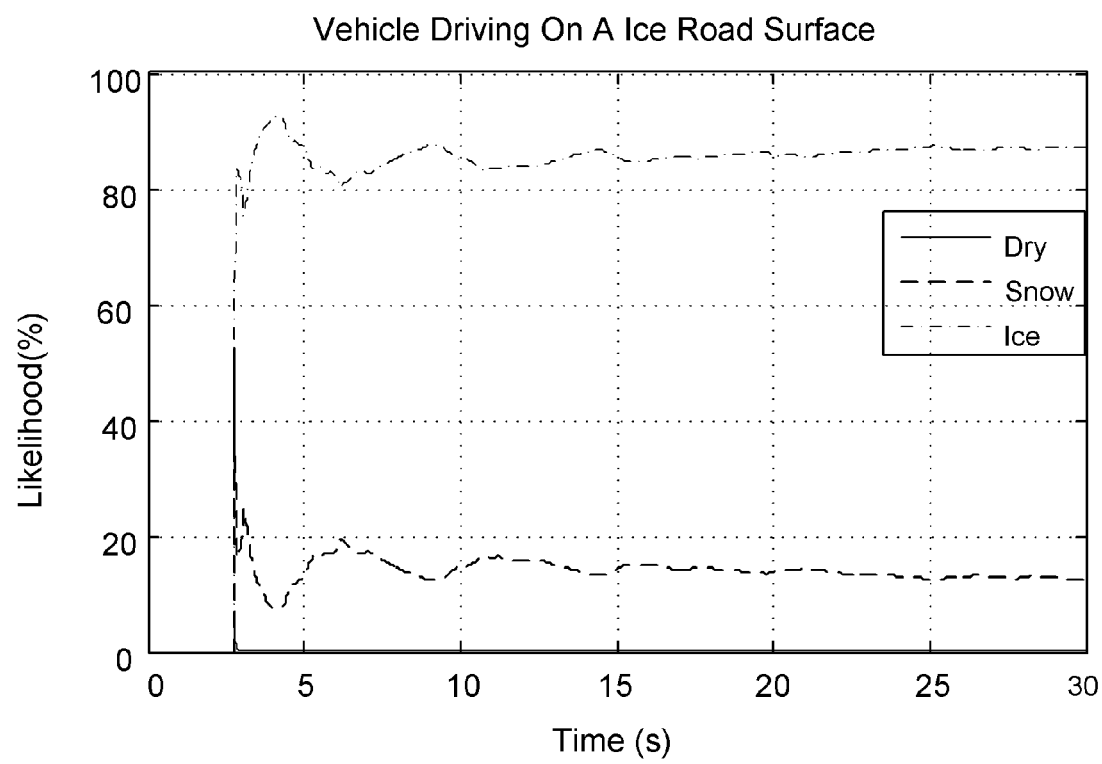
FIG. 5 is an illustrative plot of the determined likelihood factors for a vehicle driving on an icy surface.
Figure 6:
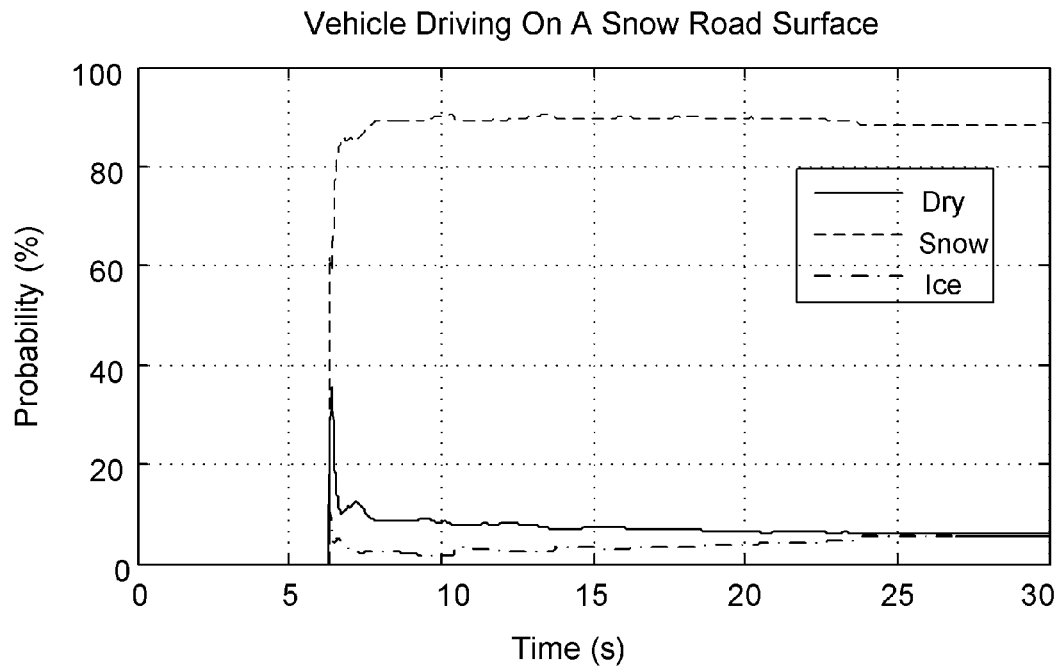
FIG. 6 is an illustrative plot of the determined likelihood factors for a vehicle driving on a snow surface.
Figure 7:
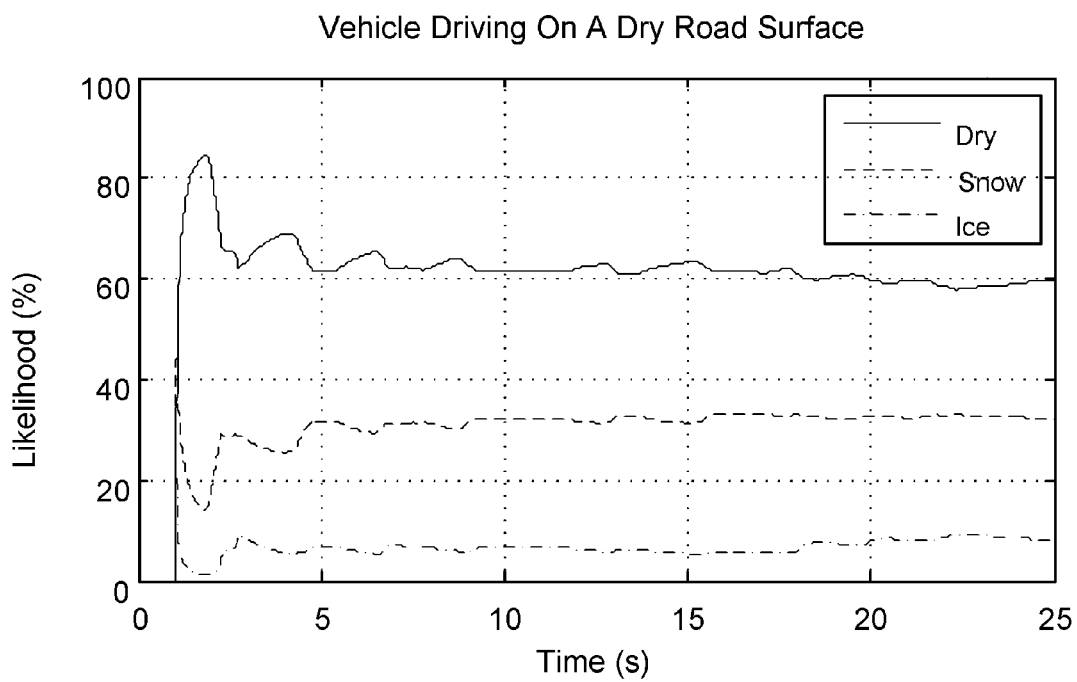
FIG. 7 is an illustrative plot of the determined likelihood factors for a vehicle driving on a dry surface.

The likelihood factors as determined by eq. (7) may be multiplied by 100 to obtain the likelihood percentages for each road surface condition. The graphs illustrated in FIGS. 5-7 are examples of likelihood percentages for examples of different road conditions. Each figure illustrates a different adhesive effect of current traveled road and the estimated likelihood of each road surface condition as determined by the statistical road surface identification technique. The results obtained by the eq. (7) for each classified road surface condition are tracked over time.

In block 39, each of the likelihood factors for each road surface condition $w_j$ are compared with one another. A respective road surface condition $w_j$ that best identifies the adhesive effect of the current road is identified from the plurality of likelihood factors, with the highest likelihood percentage representing the most likely road surface condition. For example, FIG. 5 illustrates an icy road surface condition. Data is collected during the vehicle operation while driving on the icy road surface. The data obtained is input in the road surface identification routine. Likelihood factors for each of the road surface conditions (i.e., icy surface, snow surface, and dry surface) were plotted. In comparing the each plotted likelihood factor, it is shown from the plots that likelihood of the vehicle being on an icy surface is approximately 85%, whereas the likelihood of the vehicle being on the snow surface or the dry surface is 15% and near 0%, respectively. FIGS. 6 and 7 illustrate plots of the likelihood factors as determined by the road surface identification technique for a vehicle driving on snowy and dry road surfaces, respectively.

In block 40, the count is reset to 1 and blocks 33-36 are repeated to monitor and identify the adhesive effect of the currently traveled road surface.

While certain embodiments of the present invention have been described in detail, those familiar with the art to which this invention relates will recognize various alternative designs and embodiments for practicing the invention as defined by the following claims.

What is claimed is:

1. A method of determining an adhesive condition of a surface of a vehicle road using a statistical pattern recognition technique, the method comprising the steps of:
   (a) providing a plurality of probability distribution functions for a plurality of road surfaces which represent respective adhesive effects between the vehicle tire of a driven vehicle and the vehicle road;
   (b) obtaining a steering wheel angle, a vehicle speed, and a yaw rate of the driven vehicle;

(c) calculating an index which represents a vehicle understeer characteristic for a vehicle traveling on a current road that is a function of the steering wheel angle input, the vehicle speed, and the yaw rate;

(d) applying a probability analysis for each of the road surface adhesive conditions as a function of the index;

(e) recursively updating the probability analysis for each respective road surface adhesive condition;

(f) determining a likelihood factor for each road surface adhesive condition as a function of each respective recursively updated probability analysis, each respective road surface adhesive condition having a respective likelihood factor that identifies the likelihood of the road surface having the respective adhesive condition as a function of the index;

(g) selecting the respective road surface adhesive condition having a highest likelihood factor among each of the determined likelihood factors; and (h) a vehicle control system adjusting control operations as a function of the selected road surface adhesive condition for enhancing vehicle stability of the vehicle.

2. The method recited in claim 1 wherein steps (b)-(g) applied for each adhesive condition are performed in parallel.

3. The method of claim 1 wherein a plurality of probability density functions is constructed and stored in a vehicle database.

4. The method of claim 1 wherein each probability analysis for each respective adhesive condition is recursively updated a predetermined number of times.

5. The method of claim 4 wherein the probability analysis is based on Bayes' rule.

6. The method of claim 5 wherein the probability analysis based on Bayes' rule is estimated based on the following formula:

$$\hat{P}(w_j \backslash \rho_k) = \frac{p(\rho_k \backslash w_j)\hat{P}_{k-1}(w_j)}{\sum_{n=1}^{N} p(\rho_k \backslash w_n)\hat{P}_{k-1}(w_n)},$$

$$j = 1, \ldots, N$$

where $p(\rho_k \backslash w_j)$ is the probability density value of the calculated index $\rho_k$ on the road surface adhesive condition and where $\hat{P}_{k-1}(w_j)$ is the probability estimate of the vehicle traveling on road surface adhesive condition $w_j$, at time step k−1.

7. The method of claim 1 wherein the likelihood factor is determined by the following formula:

$$\hat{L}(w_j) = \frac{1}{M} \sum_{i=k-M+1}^{k} \hat{P}(w_j \backslash \rho_i)$$

$$(j = 1, 2, \ldots, N)$$

where $\hat{P}(w_j \backslash \rho_k)$ is the probability analysis for each road surface adhesive condition $w_j$, based on the calculated index $\rho_k$ and wherein M is a predetermined fixed value.

8. The method of claim 7 wherein the likelihood factor is output as a probability percentage of the road surface having the adhesive condition.

9. The method of claim 7 wherein the identification of the adhesive condition includes determining the higher probability between each of the respective likelihood factors.

10. The method of claim 1 wherein the index is determined as a function of the yaw rate that is derived as a function of a front and rear axle cornering stiffness.

11. The method recited in claim 1 wherein a vehicle front wheel steering angle is a vehicle operating characteristic derived by a driver's steering input.

12. A method of determining an adhesive condition of a surface of a vehicle road using a statistical pattern recognition technique, the method comprising the steps of:

(a) providing a plurality of probability distribution functions for a plurality of road surfaces which represent respective adhesive effects between the vehicle tire of a driven vehicle and the vehicle road;

(b) setting a count to an initial setting;

(c) obtaining vehicle operating characteristic data;

(d) determining an index based on the vehicle operating characteristic data;

(e) applying a probability analysis for each adhesive condition road surface as a function of the determined index;

(f) recursively updating the probability analysis for each respective road surface adhesive condition as a function of the count;

(g) determining whether the count is less than a predetermined number;

(h) repeating steps (c)-(g) if the count is less than the predetermined count;

(i) determining a likelihood factor for each road surface adhesive condition as a function of each respective recursively updated probability analysis, each respective road surface adhesive condition having a respective likelihood factor that identifies the likelihood of the road surface having the respective adhesive condition as a function of the index;

(j) selecting the respective likelihood factor that identifies the adhesive condition of the road surface traveled by the vehicle; and (k) selecting the respective road surface adhesive condition having a highest likelihood factor among each of the determined likelihood factors; and (l) a vehicle control system adjusting control operations as a function of the selected road surface adhesive condition for enhancing vehicle stability of the vehicle.

13. The method of claim 12 wherein steps (a)-(j) are repeated after inputting the identified adhesive condition into the vehicle control process.

14. The method of claim 12 wherein the likelihood factor is output as a probability percentage of the road surface having the adhesive condition.

* * * * *